United States Patent [19]

Muller et al.

[11] 3,897,656

[45] Aug. 5, 1975

[54] MACHINE FOR MANUFACTURING OR TESTING THE TOOTH FLANKS OF INVOLUTE GEARS

[75] Inventors: Winfried Müller, Ettlingen; Hans-Ulrich Bertz, Rastatt, both of Germany

[73] Assignee: Dr. Ing. Willy Hofler, Karlsruhe, Germany

[22] Filed: Feb. 5, 1973

[21] Appl. No.: 329,856

[30] Foreign Application Priority Data
Feb. 8, 1972 Germany............................ 2205819
Feb. 8, 1972 Germany............................ 2205820
Feb. 8, 1972 Germany............................ 2205821

[52] U.S. Cl. ............... 51/123 G; 33/179.5 D; 90/9
[51] Int. Cl. ........ B24b 5/00; B23b 5/02; G01b 5/20
[58] Field of Search..... 51/52, 93 G, 123 G, 95 GH; 33/179.5 R, 179.5 D; 90/3, 6, 8, 9, 10; 74/25, 29, 30

[56] References Cited
UNITED STATES PATENTS
| | | | |
|---|---|---|---|
| 1,135,780 | 4/1915 | Drummond et al............... | 51/123 G |
| 1,515,281 | 11/1924 | Schurr ............................. | 51/123 G |
| 1,662,589 | 3/1928 | Simmons.......................... | 51/123 G |
| 2,187,062 | 1/1940 | Sykes............................... | 51/123 G X |
| 2,850,851 | 9/1958 | Graf.................................. | 51/123 G |
| 3,624,972 | 12/1971 | Graf.................................. | 51/123 G X |

*Primary Examiner*—Othell M. Simpson

[57] ABSTRACT

For producing the movement of the parts in a gear generating or testing machine which has a sliding carriage on which is turnably mounted a table for gears to be cut or tested, the motion of the gear is produced by a single motor which either drives a block mounted in a guideway arranged at an angle to the path of movement of the slide and which further produces transverse movement of another member having a slanting groove in which moves a block connected to a part which produces turning movement of the table, or the motor drives a block which includes two sloping slots one of which produces the longitudinal movement of the carriage while the other produces the rotary movement of the table.

8 Claims, 4 Drawing Figures

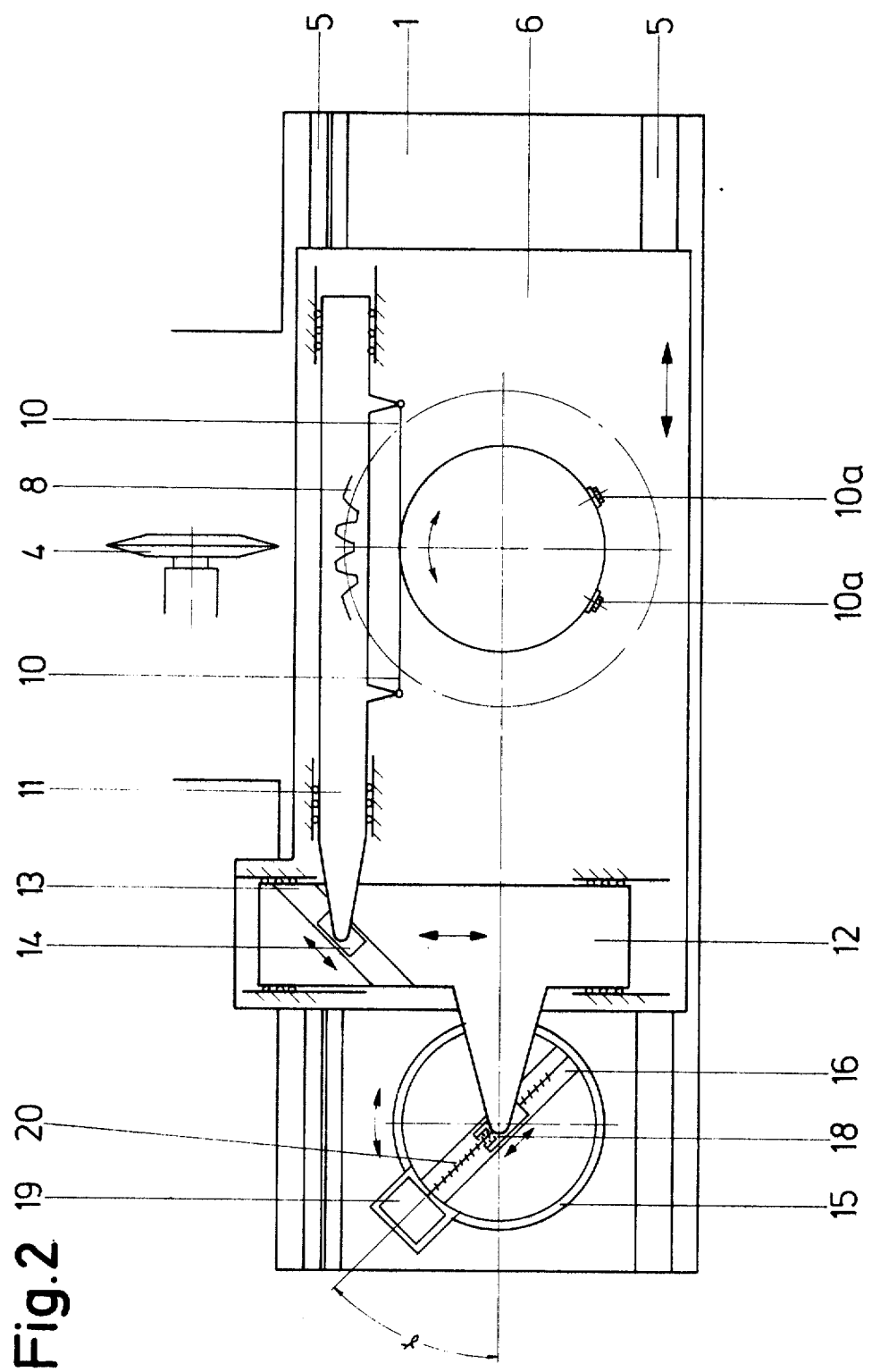

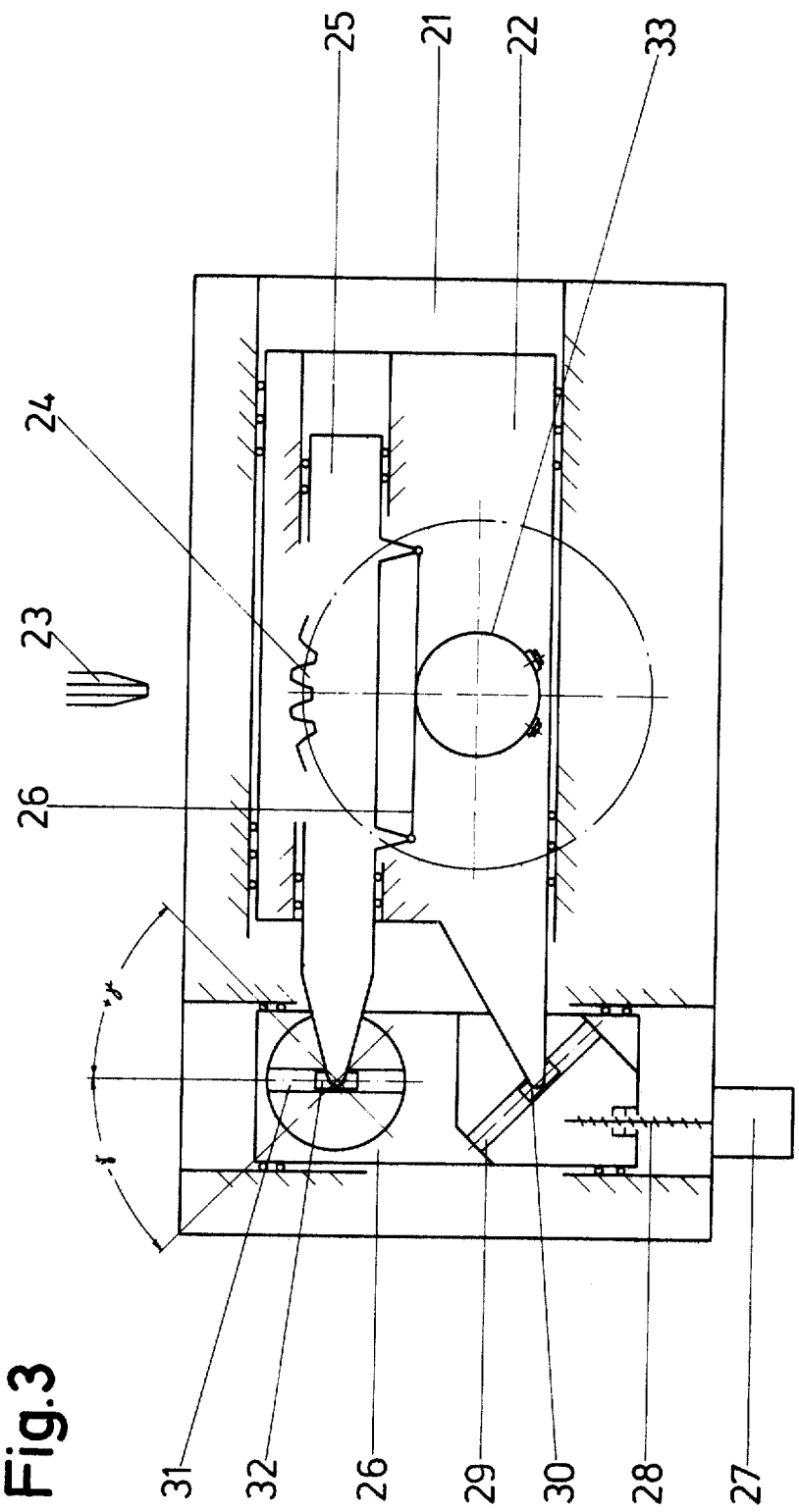

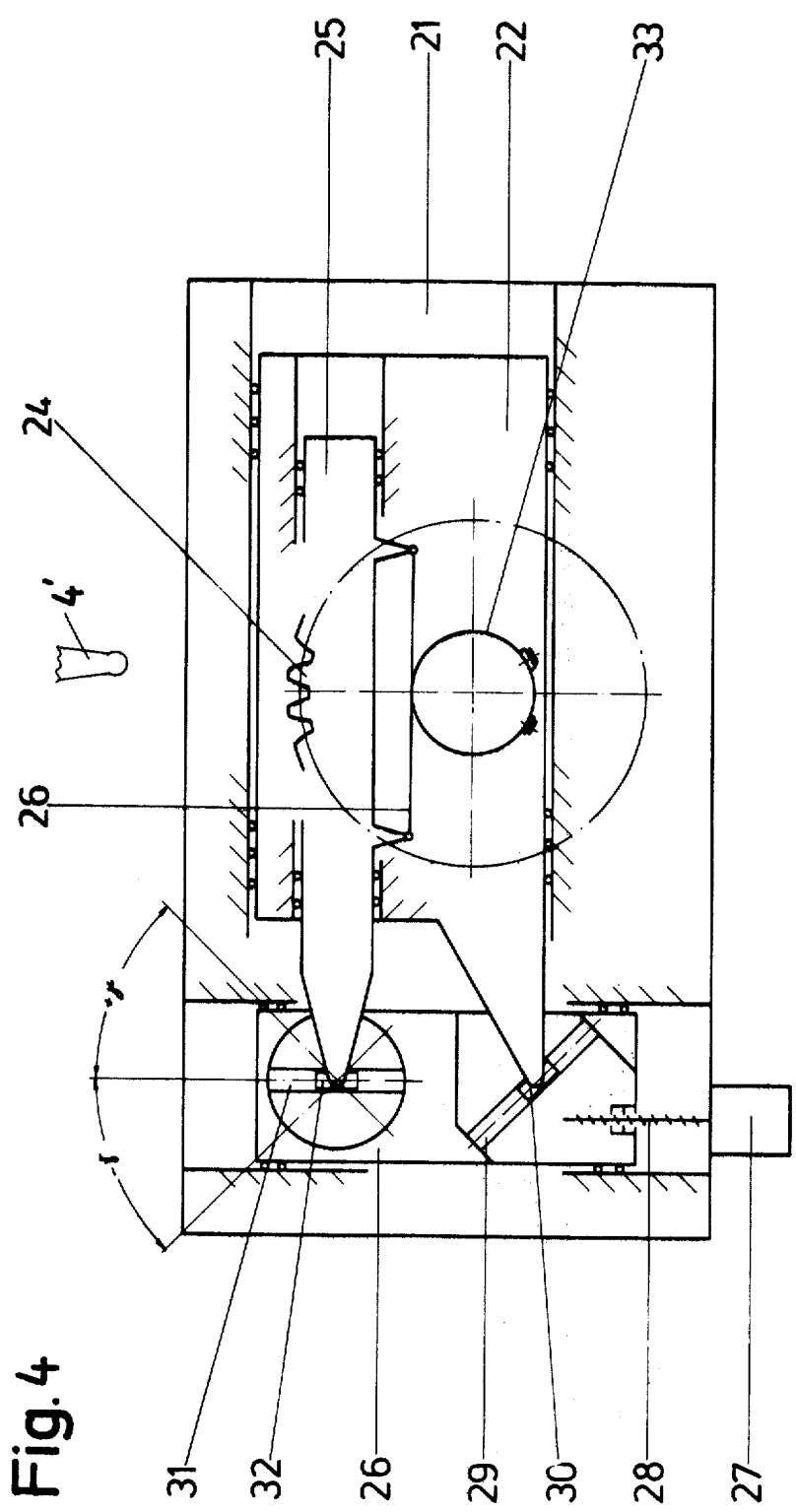

MACHINE FOR MANUFACTURING OR TESTING THE TOOTH FLANKS OF INVOLUTE GEARS

BACKGROUND OF THE INVENTION

1. Field of the Invention

The invention relates to a machine for the manufacture or testing of the tooth flanks of involute toothed gears.

More specifically the invention relates to a machine for the production or testing of tooth flanks with involute teeth which includes a stationary machine stand, a work piece table mounted for translatory movement thereon perpendicular to the tool or tester, and a toothed gear turnably mounted on the table as well as a tool which performs a back-and-forth periodic stroke movement or is stationary or a tester which is stationary for each testing operation, wherein the toothed gear undergoes a rolling movement with the translatory component and a rotary component, and in the case of a stationary workpiece additionally a stroke movement, for which purpose the work piece table carries a displaceable auxiliary sliding carriage, which imparts to the toothed gear the rotary component of the rolling movement directly or indirectly through roll straps fastened to a cylinder which is connected with the tooth gear and coaxial therewith or through the engagement of a rack with a gear segment connected coaxially with the toothed gear, and wherein the auxiliary carriage carries a sliding block which is movable in a guiding track which is angularly adjustable and fixable in regard to its direction.

2. The Prior Art

Such a machine is the subject of the Hofler applicaton Ser. No. 407,481, which is a continuation of application Ser. No. 118,683, filed Feb. 25, 1971. Therein the rolling drive is so constructed that either the work piece table or the auxiliary slide can be driven translatorily by means of a drive spindle, wherein both spindles must be capable of being disconnected in case that, for the time being, the other spindle is being driven. The requirement for two drive spindles in addition to their corresponding drive motors and couplings has the result that the forces produced between the guide track and the slide block part by their displacement are too great if the guide track has with respect to the axis of that particular spindle an angular position of more than 45°. The provision of two drive spindles along with their drives and their couplings means however additional expense of construction and apparatus, which influences the operating costs of the roll drive and therewith the machine unfavorably.

SUMMARY OF THE INVENTION

The purpose of the invention is then to provide the possibility that in a machine of the previously described type the rolling motion of the tooth gear can be produced with only one drive spindle and its associated drive aggregate.

This purpose is achieved according to the invention in that for the production of the translatory and the rotary movement components, either the guide block is displaceable in its track by an auxiliary slide mounted in a housing fixedly arranged with respect to the machine stand and movable therein perpendicularly to the translatory component of the movement of the work piece table by a drive motor which is swingable with the guide slot, or that the housing by an auxiliary slide displaceable parallel to the translatory component of the workpiece table on this table is movable perpendicular thereto by a drive motor fixed on the machine stand and affects a second guide track for the translatory component of the movement in which the work piece table engages with a slide block.

Through these measures both the work piece table and the auxiliary slide can be moved through a single common drive, without the production of excessivly high forces between the guide slot and the slide block or without its being necessary to consider a decrease of the range of the adjustment range relative to different base circle diameters of the tooth gear must be taken into consideration.

In the case where the auxiliary slide is displaceable perpendicular to the translatory component of the work piece table it may be advantageous that the roll bands are fastened on a second auxiliary slide, or that this has the toothing and the second auxiliary slide is displaced on the work piece table at right angles to the first auxiliary slide tangential to the work piece spindle and its slide block guided by means of a guide slot arranged at 45° to the direction of movement of the first auxiliary slide. This allows the first auxiliary slide to be made shorter, so that for predetermined cases an assurance can be provided that the first auxiliary slide does not collide with the part of the machine stand which carries the tool or tester.

In the case in which according to the invention the housing for the guide slot is driven, the second guide slot for the work piece table can run at an angle in the range of 45° to the translatory component of the rolling movement. It is especially advantageous however that the second guide slot is arranged at an angle of about 38° to the translatory component of the rolling movement, because in this way with permissible reaction forces between the guide slot and the sliding block the adjustment range relative to different base circle diameters of the work piece can be increased.

BRIEF DESCRIPTION OF THE DRAWINGS

The invention is hereafter explained more fully from the embodiments, which are shown in the drawings. In the drawings:

FIG. 2 is a partial plan view of the machine according to FIG. 1;

FIG. 3 is a view corresponding to FIG. 2, however of another embodiment of the invention; and FIG. 4 is a view similar to FIG. 3 showing a testing machine.

DESCRIPTION OF THE PREFERRED EMBODIMENTS

Figure 1:
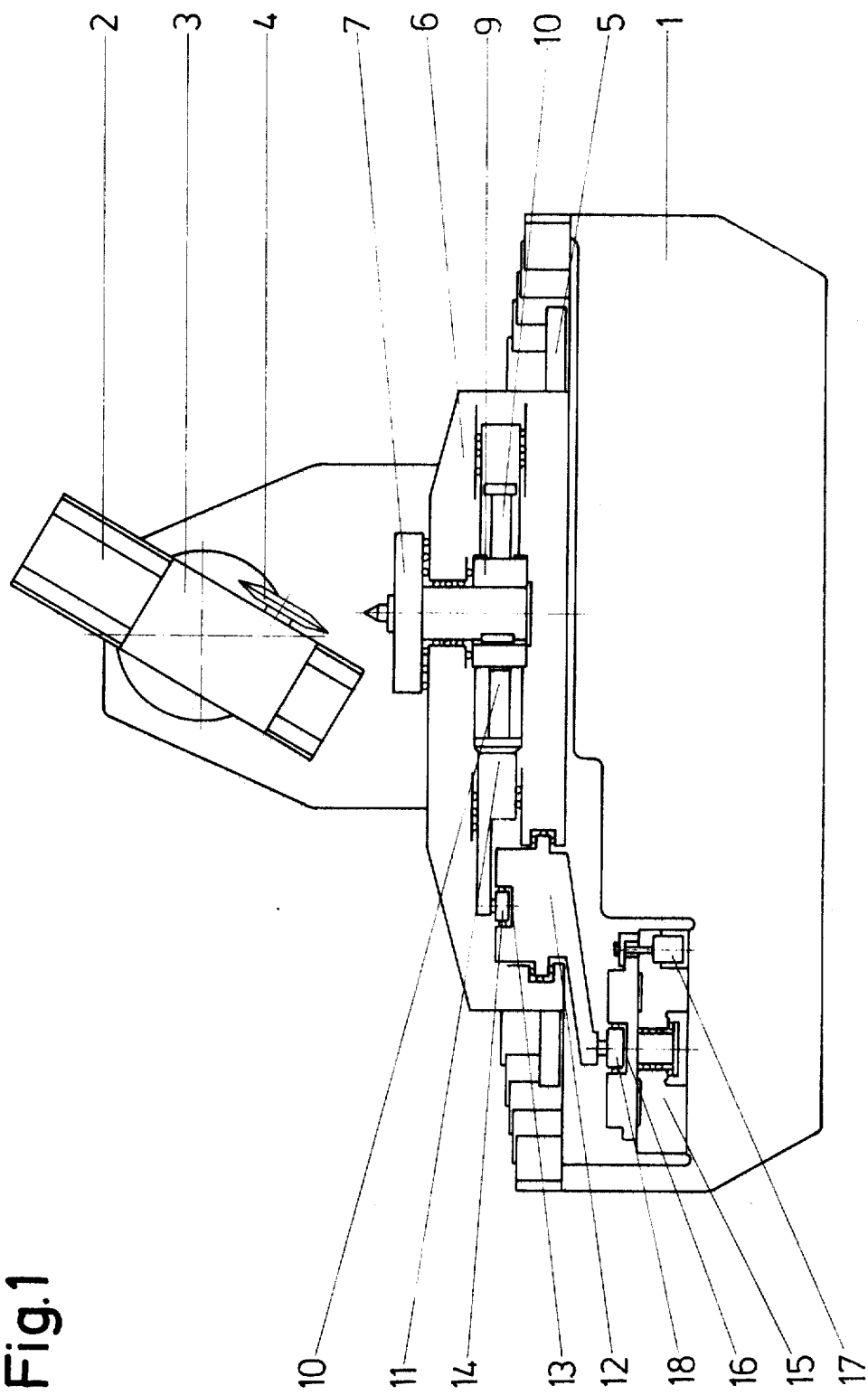
FIG. 1 is a front view of a machine for grinding the tooth flanks of involute gears partly cut away.

The machine according to FIGS. 1 and 2 has a machine stand 1. On the machine stand 1 is the angularly adjustable guide track 2 for a reciprocating slide 3 with a driven grinding disc 4, in order to adjust the reciprocating movement to the slant angle of the tooth flanks.

Also on the machine stand 1 a work piece table 6 is slidable in guides 5 transverse to the movement of the grinding disc 4. The work piece table 6 carries a turnable round table 7 on which a tooth gear 8 can be secured. The round table 7 has a coaxial cylinder 9 to which the roll bands 10 can be fastened, for example by screws. The other ends of the roller bands 10 are fastened on an auxiliary slide 11, which is guided on the work piece table 6 for movement parallel to the direction of movement of the work piece table.

An auxiliary slide 11 is displaceably mounted on the work piece table 6 for movement perpendicular to the direction of movement of the work piece table 6 and the auxiliary slide 11, which has a guide slot 13 at an angle of 45°, with which the auxiliary slide 11 engages through a slide block 14.

On the machine stand 1 and stationary with it is a housing 15, in which a member containing a guide slot 16 is turnably journalled and, for example through a spring element in the form of a cylinder-piston aggregate 17, can be fixed in position. The auxiliary slide 12 connects with this guide slot by a slide block 18. The slide block can be given a movement of displacement by a drive motor 19 and an intermediate connecting spindle 20. The motor 19 is connected to, and swingable and fixable with, the part in which the guide slot 16 is formed.

The operation of the rolling arrangement described is as follows:

If the slide block 18 moves along the spindle 20 of the drive motor 19, this leads in accordance with the angular adjustment of the guide slot 16 through the slide block 18 to a translatory displacement movement of the work piece table 6 and/or the auxiliary slide 12. Through the movement of the work piece table 6 the toothed gear 8 is given the translatory component of its rolling movement.

The displacement of the auxiliary slide 12 through the guide slot 13 and the slide block 14 simultaneously produces a displacement of the auxiliary slide 11, which imparts to the tooth gear 8 through the tension bands 10 and the cylinder 9 the rotary component of the rolling movement. Through adjustment of the angular position of the guide groove 16 the translatory and rotary components of the rolling movement for the tooth gear 8 can be adjusted to the existing requirements.

The drive described in connection with FIGS. 1 and 2 of the guide block 18 can naturally equally be used if the auxiliary slide 11 is omitted and the tension bands 10 are fastened to the auxiliary slide 12, so that the auxiliary slide 12 imparts on the one hand to the work piece table 6 the translatory component on the rolling off movement and on the other hand directly to the toothed gear 6 the rotary component of the rolling movement. However in this case the auxiliary slide 12 must be longer, which is not always advantageous, because the auxiliary slide 12 and the part of the machine stand which carries the reciprocating slide 3 can on occasions be damaged.

FIG. 3 explains a further form of the invention. In this again on the machine stand 21 a work piece table 22 is movable transversely to the work piece 23 and carries corresponding to the modification according to FIG. 1 a turnably journalled tooth gear 24 to be worked on and likewise, perpendicularly displaceable with respect to the tool 22, an auxiliary slide 25, which is connected with the tooth gear 24 through the roller bands 26.

Besides a housing 26 is displaceably guided perpendicular to the direction of movement of the work piece table 22 and the auxiliary slide 25 on the machine bed 21 which can be moved through a driving motor 27 fixedly on a machine table 21 through a spindle 28. The housing 26 carries at the same time a guide slot 29 fixed to it and slanted with respect to the direction of movement of the work piece table 22, with which the work piece 22 engages through a slide block 30.

Additionally the housing 26 carries an angularly adjustable guide path 31, in which a slide block 32 carried by the auxiliary slide 25 engages. The guide slot 31 can for example be adjustable in the manner shown in FIG. 1.

The mode of operation of the rolling drive according to FIG. 3 is the following:

If the housing 25 is moved by the drive spindle 28 of motor 27, this leads to a corresponding movement of the work piece table 22 through the guide slot 29 and the slide block 30, which movement is dependent on the angular position of the guide slot 29, whereby the toothed gear 24 is given the translatory component of the rolling movement necessary for the working of the tooth flanks.

But movement of the housing 26 simultaneously produces by means of the guide slot 31 and the slide block 32 a movement of the auxiliary slide 25, whereby the rotary component of the rolling movement is given through the roll bands 26 to the toothed gear 24. The size of this rotary movement is dependent upon the angle of adjustment of the adjustable guide slot 31, so that the predetermined angle of adjustment is adjusted to a toothed gear of which the rolling circle diameter corresponds with the diameter of the cylinder 33.

The range of sizes of the rolling circle diameter of the toothed gears, which can be worked with the rolling drive shown, is for a predetermined diameter of the cylinder 33 dependent on the adjustment range of the angle $\gamma$, in which the forces produced by the guide slot 31 and the slide block 32 remain within permissible limits. It has been shown that in this way angles of 50° to 55° can even be directly represented.

If the diameter of the cylinder 33 for example is 100 mm and if for the normal case the guide slot 29 is sloped at an angle of 45°, a toothed gear with a rolling circle diameter of about 44.5 mm up to infinity can be operated on, if the angle is not allowed to be greater than about 52°. This results in the following equation:

$$\pm \tan \gamma = \frac{d_{we}}{d_{ww}} - \tan(90 - \alpha),$$

wherein $d_{we}$ is the diameter of the cylinder 33 and $d_{ww}$ is the rolling circle of the respective toothed gear.

If however the angle of the tooth slot 29 with respect to the direction of movement of the work piece table 22 is chosen as 38°, so that also in the guide slot 29 for neither of the two movements of direction of the guide slide 25 a greater angle than 52° exists (complimentary angle to the angular position of the guide slot 29), then it is possible to work to smaller rolling circle diameters of the toothed gears with a broadening of the above given rolling circle diameter range, so that also tooth gears even with a rolling circle diameter of 40 mm can be handled with a cylinder 33 with a diameter of 100 mm.

Naturally there exists the possiblity also to arrange the guide slot 29 adjustably in the housing 26 so as to obtain for individual requirements through adjustment of the angular position the optimal conditions.

The described modifications then constitute as the invention a machine in which a tool in the form of a grinding disc 4 undergoes the reciprocatory movement. But naturally also there is the possibility that the reciprocatory movement is imparted to the gear, in which for example the round table 7 according to FIG. 1 in its center includes a cylinder-piston aggregate by which the carrier plate of the round table is movable up and down.

Finally the machine described according to the invention can be used equally for testing the form of finished tooth flanks, in which the tool 4 is substituted by a tester 4' (FIG. 4), which is stationary for each testing operation.

In the modification of FIG. 1 and FIG. 2, the slide block 18 is a member which, when moved by the motion 19, produces both longitudinal movement of the table 6 and turning of the carrier 7. In the form of FIG. 3, the housing 26 is a member whose movement by motor 27 has the same effects.

We claim:

1. In a machine for operating on involute spur gears and helical gears wherein the work piece performs a rolling off action with respect to a tool, which rolling off motion is composed of a component of purely rotary motion and a component of purely rectilinear motion, first means for producing such motion comprising a machine stand, a table movable on said stand in a rectilinear direction relative to a tool; a work piece holder rotatably on said machine table for rotation about an axis fixed with respect to the table, and perpendicular to the direction of movement of the table and rectilinearly movable therewith, second means forming a track stationary with respect to the stand, a member movable in said track at a transverse angle with respect to the direction of movement of the table, third means operating directly on said member to impart movement to such member in said track, fourth means connecting said member to the table to produce longitudinal motion of the table in response to movement of the member in the track, and fifth means responsive to the movement of the member in the track to impart turning movement to the work piece support.

2. In a machine as claimed in claim 1, said stand having a guide slot therein positioned at an angle to the direction of movement of the table and said member comprising a slide block movable in said guide slot.

3. In a machine as claimed in claim 2, said third means including a part movable in said table perpendicular to the direction of movement of the table and connected to said member, and said fourth means including means responsive to the movement of said part.

4. In a machine as claimed in claim 3, said part having a guide slot therein at an angle to the direction of movement of the table, and said fourth means including a slide block movable in said guide slot and operatively connected to said holder.

5. In a machine as claimed in claim 2, means to adjust the angular position of said guide slot.

6. In a machine as claimed in claim 1, said member comprising a part movable in the machine stand perpendicular to the direction of movement of the table.

7. In a machine as claimed in claim 6, said member having a first guide slot therein at an angle to the direction of movement of the table and said third means including first a slide block movable in said first guide slot and connected to said table.

8. In a machine as claimed in claim 7, said member having a second guide slot therein positionable at an angle to the direction of movement of the table, said fourth means comprising a second slide block movably mounted in said second guide slot and operatively connected to said carrier.

* * * * *